US011879399B2

United States Patent
Oberti et al.

(10) Patent No.: US 11,879,399 B2
(45) Date of Patent: Jan. 23, 2024

(54) METHOD FOR DETECTING AN INVERTED CONNECTION OF THE INTAKE TIMING ACTUATOR AND THE EXHAUST TIMING ACTUATOR

(71) Applicant: VITESCO TECHNOLOGIES GMBH, Regensburg (DE)

(72) Inventors: Nicolas Oberti, Toulouse (FR); Fabien Joseph, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/777,933

(22) PCT Filed: Nov. 16, 2020

(86) PCT No.: PCT/EP2020/082183
§ 371 (c)(1),
(2) Date: May 18, 2022

(87) PCT Pub. No.: WO2021/099238
PCT Pub. Date: May 27, 2021

(65) Prior Publication Data
US 2023/0016394 A1 Jan. 19, 2023

(30) Foreign Application Priority Data
Nov. 19, 2019 (FR) .................. 1912883

(51) Int. Cl.
*F02D 41/22* (2006.01)
*F02D 13/02* (2006.01)
*F02D 41/00* (2006.01)

(52) U.S. Cl.
CPC ....... *F02D 13/0215* (2013.01); *F02D 41/009* (2013.01); *F02D 41/221* (2013.01)

(58) Field of Classification Search
CPC ............ F02D 13/0215; F02D 13/0203; F02D 13/0219; F02D 41/009; F02D 41/221;
(Continued)

(56) References Cited

U.S. PATENT DOCUMENTS 6,557,525 B2  5/2003  Ogawa et al.
7,055,473 B2  6/2006  Katayama
(Continued)

FOREIGN PATENT DOCUMENTS

CA  2354749 A1  2/2002
CA  2450416 A1  5/2004
(Continued)

OTHER PUBLICATIONS

International Search Report dated Feb. 24, 2021, for PCT/EP2020/082183 (6 pp., including English translation).
(Continued)

*Primary Examiner* — Hai H Huynh
(74) *Attorney, Agent, or Firm* — NIXON & VANDERHYE

(57) ABSTRACT

A method, for an internal combustion engine including an intake camshaft equipped with a variable intake valve timing device including an intake timing actuator and an exhaust camshaft equipped with a variable exhaust valve timing device including an exhaust timing actuator, of detecting inverted connection of the intake timing actuator with the exhaust timing actuator, including: measuring the angular position of the intake camshaft and the angular position of the exhaust camshaft; commanding one of the two timing actuators according to a setpoint and keeping the other of the two timing actuators immobile; measuring the angular positions of the intake camshaft and of the exhaust camshaft; and comparing: if the angular position of the camshaft corresponding to the timing actuator that's been commanded has
(Continued)

not been modified, and if the angular position of the camshaft corresponding to the immobile timing actuator has been modified, inverted connection can be diagnosed.

20 Claims, 1 Drawing Sheet

(58) Field of Classification Search
CPC .............. F02D 41/22; F02D 41/0002; F02D 2041/2086; F02D 2041/001; Y02T 10/12; Y02T 10/40
USPC ........ 123/90.15, 90.16, 90.17; 701/103, 110, 701/107; 73/114.31, 114.32, 114.33, 73/114.37, 114.79, 115.01
See application file for complete search history.

(56) References Cited

U.S. PATENT DOCUMENTS

| | | |
|---|---|---|
| 7,487,031 B2 | 2/2009 | Yasui et al. |
| 9,347,413 B2 | 5/2016 | Schüle et al. |
| 2013/0180505 A1 | 7/2013 | Schuele et al. |
| 2014/0366822 A1 | 12/2014 | Jang |

FOREIGN PATENT DOCUMENTS

| | | | |
|---|---|---|---|
| CN | 101162000 A | 4/2008 | |
| DE | 197 50 024 | 5/1999 | |
| DE | 10 2010 027 213 | 1/2012 | |
| EP | 1911954 A1 | 4/2008 | |
| JP | H11223150 A | 8/1999 | |
| JP | 3846600 | * 11/2006 | ........... F02D 41/221 |

OTHER PUBLICATIONS

Written Opinion dated Feb. 24, 2021, for PCT/EP2020/082183 (4 pp.).

Office Action issued in Chinese Patent Application No. 202080079890.3 dated Oct. 30, 2023.

* cited by examiner

[Fig. 1]
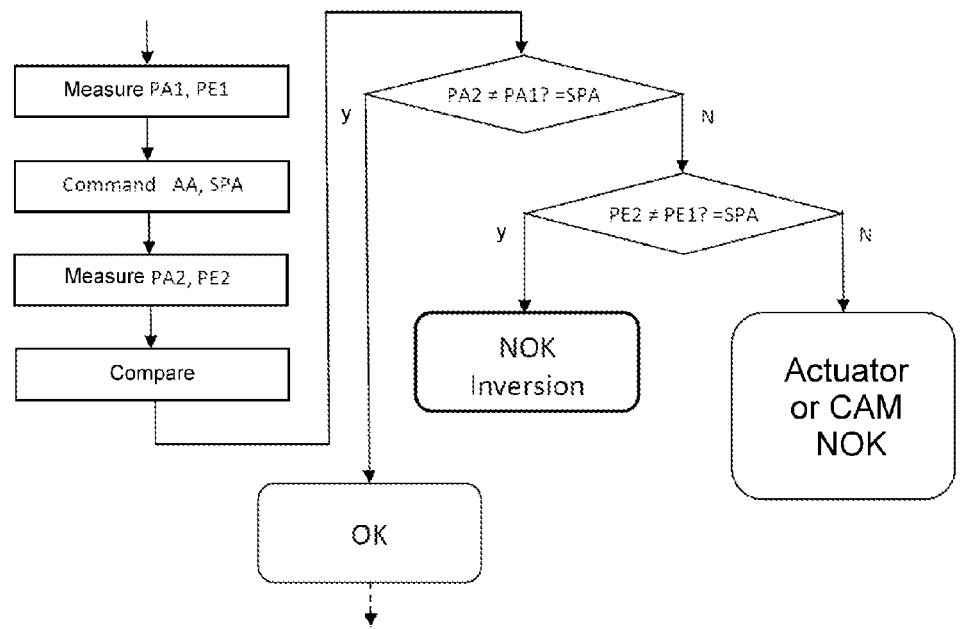
[Fig. 2]
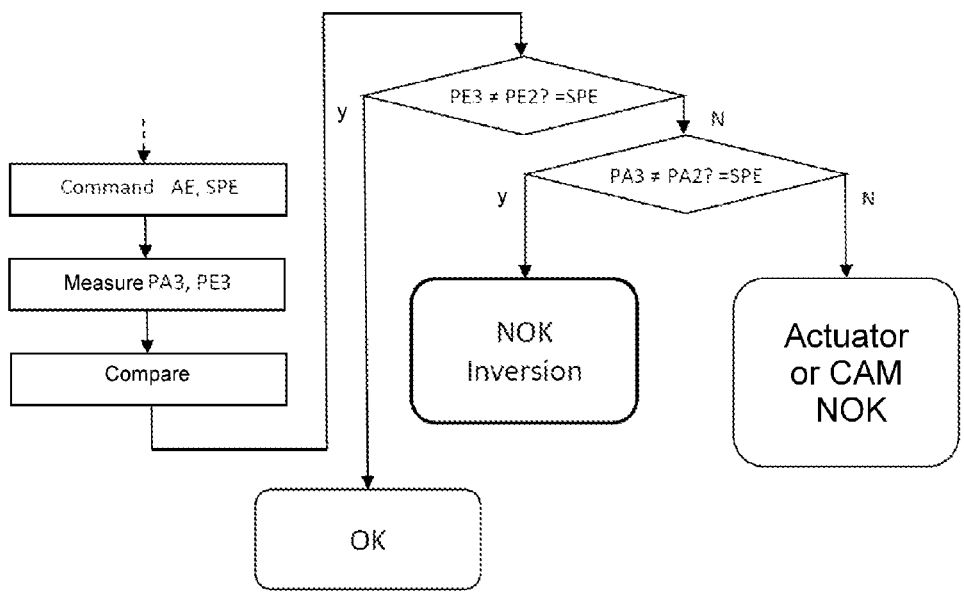

METHOD FOR DETECTING AN INVERTED CONNECTION OF THE INTAKE TIMING ACTUATOR AND THE EXHAUST TIMING ACTUATOR

This application is the U.S. national phase of International Application No. PCT/EP2020/082183 filed Nov. 16, 2020 which designated the U.S. and claims priority to FR 1912883 filed Nov. 19, 2019, the entire contents of each of which are hereby incorporated by reference.

BACKGROUND OF THE INVENTION

Field of the Invention

The invention relates to the field of engine control and of measurement of the angular position of a camshaft, and more particularly to a method for detecting inverted connection of the intake timing actuator and the exhaust timing actuator.

Description of the Related Art

As is known, an internal combustion engine comprises a crankshaft which performs two revolutions per engine cycle and two camshafts: an intake camshaft operating the intake valves and an exhaust camshaft operating the exhaust valves. The camshafts are synchronized with the crankshaft and rotate half as quickly, namely at one revolution per engine cycle.

Because of the cumulative effect of all of the manufacturing tolerances there may be an offset of +/−18° Crk between the angular position of a camshaft and that of the crankshaft. One degree of crankshaft angle, or degree crank, also abbreviated to ° Crk is an angle of 1 degree measured relative to the angular position of the crankshaft. Also, the angular position of a camshaft is determined soon after a start in order to fix this offset by identifying it.

A camshaft advantageously comprises a variable valve timing, or VVT, means allowing modification of the angular position, also known as the timing, of the camshaft relative to the crankshaft. This is performed using a timing actuator. Thus, an intake timing actuator allows the intake camshaft to be offset in a range for example comprised between −50° and 0°, thus allowing the intake to be advanced. Likewise, an exhaust timing actuator allows the exhaust camshaft to be offset in a range for example comprised between 0° and +50°, thus allowing the exhaust to be retarded.

The connectors of the cables carrying the respective control signals for commanding the two timing actuators do not have poka-yoke features and are situated side-by-side. As a result, inversion is possible, upon assembly at the end of the production line or at a dealership during a repair. It goes without saying that such an inversion causes problems.

The invention proposes a method for detecting such an inversion and the creation of a new specific diagnostic indicator.

SUMMARY OF THE INVENTION

In order to address this problem, the principle is to command one of the two timing actuators according to a given setpoint and to keep the other timing actuator immobile. A re-reading of the angular positions of the two camshafts then makes it possible to verify that only the camshaft corresponding to the timing actuator that has been commanded has moved, and preferably that its angular position is compatible with the given setpoint and that the other camshaft has remained immobile. If the reverse is true, inverted connection can be diagnosed.

In order to do that, one subject of the invention is a method, for an internal combustion engine comprising an intake camshaft equipped with a variable intake valve timing device comprising an intake timing actuator and an exhaust camshaft equipped with a variable exhaust valve timing device comprising an exhaust timing actuator, of detecting inverted connection of the intake timing actuator with the exhaust timing actuator, comprising the following steps: measuring the angular position of the intake camshaft and the angular position of the exhaust camshaft; commanding one of the two timing actuators that are the intake timing actuator and the exhaust timing actuator according to a setpoint and keeping the other of the two timing actuators immobile; measuring the angular position of the intake camshaft and the angular position of the exhaust camshaft; and comparing: if the angular position of the camshaft corresponding to the timing actuator that has been commanded is not compatible with the setpoint or preferably has not been modified, and if the angular position of the camshaft corresponding to the immobile timing actuator has been modified, or preferably is compatible with the setpoint, inverted connection can be diagnosed.

Particular features or embodiments, which may be used alone or in combination, are:
  the comparison step further comprises: if, on the other hand, the angular position of the camshaft corresponding to the timing actuator commanded has been modified but is not compatible with the setpoint, or if the angular position of the camshaft corresponding to the immobile timing actuator has been modified but is not compatible with the setpoint, a secondary problem can be diagnosed,
  the method further comprises, preferably if no connection inversion has been diagnosed, the following steps: commanding the other of the two timing actuators that are the intake timing actuator and the exhaust timing actuator according to a setpoint and keeping the first of the two timing actuators immobile; measuring the angular position of the intake camshaft and the angular position of the exhaust camshaft; and comparing: if the angular position of the camshaft corresponding to the timing actuator that has been commanded is not compatible with the setpoint or preferably has not been modified, and if the angular position of the camshaft corresponding to the immobile timing actuator has been modified, or preferably is compatible with the setpoint, inverted connection can be diagnosed,
  the comparison step further comprises: if, on the other hand, the angular position of the camshaft corresponding to the timing actuator commanded has been modified but is not compatible with the setpoint, or if the angular position of the camshaft corresponding to the immobile timing actuator has been modified but is not compatible with the setpoint, a secondary problem can be diagnosed,
  the comparison incorporates a tolerance on the mounting of the camshaft relative to the crankshaft, preferably of +/−18° Crk,
  the secondary problem is a fault with the commanded timing actuator if an identification of the camshaft signals has been performed, and a fault whereby the camshaft sensor is out of tolerance, if the identification of the camshaft signals has not been performed, a setpoint is, respectively, a minimum or maximum end-of-travel position of the timing actuator.

A second aspect of the invention relates to a device implementing such a method.

A third aspect of the invention relates to a vehicle comprising such a device.

BRIEF DESCRIPTION OF THE DRAWINGS

The invention will be better understood from reading the following description, given solely by way of example, and with reference to the appended drawings, in which:

FIG. 1 shows a block diagram of a first part of the method,

FIG. 2 shows a block diagram of a second part of the method.

DESCRIPTION OF THE PREFERRED EMBODIMENTS

The principle of the invention is to actuate just one out of the intake timing actuator AA or the exhaust timing actuator AE and to observe, by means of the corresponding camshaft sensors, the impact this has on the angular positions PA, PE of the intake and exhaust camshafts.

An internal combustion engine comprises an intake camshaft and an exhaust camshaft. The intake camshaft is equipped with a variable intake valve timing device comprising an intake timing actuator AA. The intake angular position PA1, PA2, PA3 of the intake camshaft can be measured by means of an intake camshaft sensor. Similarly, the exhaust camshaft is equipped with a variable exhaust valve timing device comprising an exhaust timing actuator AE. The exhaust angular position PE1, PE2, PE3 of the exhaust camshaft can be measured by means of an exhaust camshaft sensor.

With reference to FIG. 1, the method for detecting inverted connection of the intake timing actuator AA with the exhaust timing actuator AE comprises the following steps. A first step measures the angular position PA1 of the intake camshaft and the angular position PE1 of the exhaust camshaft.

A camshaft sensor comprises a toothed wheel comprising a number of irregular teeth and rotating with the camshaft, supplemented by an immobile sensitive element positioned facing said toothed wheel.

A first measurement PA1, PE1 of the angular position of a camshaft is performed as a function of the crankshaft sensor which provides it with an angular reference. A first measurement PA1, PE1 provides a reference for subsequent use.

An angular-position measurement PA1, PE1, PA2, PE2, PA3, PE3 comprises a profile comprising as many tooth rising fronts, alternating with as many tooth falling fronts as there are teeth on the toothed wheel. The angular position PA1, PA2, PA3, PE1, PE2, PE3 is given by the position of these fronts relative to the crankshaft reference. Because the teeth are irregular, the distances between the fronts are unequal and enable the angular position of the toothed wheel and therefore of the camshaft to be uniquely identified.

During the course of a second step, the two timing actuators AA, AE are commanded to move into given positions.

Advantageously, for the purposes of simplification, one of the two timing actuators out of the intake timing actuator AA and the exhaust timing actuator AE is controlled using a setpoint SPA, SPE such that it absolutely must change its angular position, and the other of the two timing actuators is kept immobile.

During the course of a third step, a new (second) measurement of the angular position PA2 of the intake camshaft and of the angular position PE2 of the exhaust camshaft is performed.

Thus, by analyzing the new angular positions PA2, PE2, the influence of the command(s) previously applied to the timing actuators AA, AE can be observed.

To simplify the explanation, it is assumed arbitrarily, and this is the assumption made in FIG. 1, that the timing actuator that is commanded is the intake timing actuator AA.

Normally, if the two actuators AA, AE are correctly connected and operational, the angular position, in this instance PA2 of the camshaft corresponding to the timing actuator commanded, in this instance AA, should have been modified, and advantageously be compatible with the commanded angular position setpoint, in this instance SPA. Likewise, the angular position, in this instance PE2, of the camshaft corresponding to the immobile timing actuator, in this instance AE, should not have been modified.

The true situation may thus be compared against the normal situation and/or against an inverted-connections configuration.

In an inverted-connections configuration, if the two actuators AA, AE are functional but have had their connections inverted, the angular position, in this instance PA2, of the camshaft corresponding to the timing actuator that was commanded, in this instance AA, is not modified. By contrast, the angular position, in this instance PE2, of the camshaft corresponding to the immobile timing actuator, in this instance AE, is modified, and advantageously is compatible with the commanded angular position setpoint, SPE.

If a normal configuration is observed, the absence of a fault may be concluded. The detection method may be terminated.

Any situation that constitutes a departure from the normal situation may be indicative of a fault and possibly of inverted connection of the two timing actuators, namely of the intake actuator AA with the exhaust actuator AE, especially if the inverted-connections configuration is observed.

Thus, if the angular position, in this instance PA2, of the camshaft corresponding to the timing actuator commanded, in this instance AA, is not compatible with the setpoint SPA, inverted connections may be assumed.

If the diagnosis is to be made more robust, the above condition may be replaced by the following condition. It may be checked that the angular position, in this instance PA2, of the camshaft corresponding to the timing actuator commanded, in this instance AA, has not been modified and that PA2 has remained identical to PA1.

Likewise, if the angular position, in this instance PE2, of the camshaft corresponding to the immobile timing actuator, in this instance AE, has been modified, and also PE2 differs from PE1, inverted connections may be assumed.

If the diagnosis is to be made more robust, the above condition may be replaced by the following condition. It may be checked that the angular position, in this instance PE2, of the camshaft corresponding to the immobile timing actuator, in this instance AE, is compatible with the setpoint SPE.

A combination of the above two conditions, in whichever of their forms, constitutes a strong presumption and inverted connections may be reasonably diagnosed.

Other problems and/or faults may also be detected according to the results of the various comparison tests. Thus, if the angular position, in this instance PA2, of the camshaft corresponding to the timing actuator commanded, in this instance AA, has been modified but not in a way compatible with the setpoint SPA, a configuration different than the normal configuration but also different than the inverted-connections configuration arises. In such a case, a secondary problem can be diagnosed.

Likewise, if the angular position, in this instance PE2, of the camshaft corresponding to the immobile timing actuator, in this instance AE, has been modified but is not compatible with the setpoint SPE, a configuration different than the normal configuration but also different than the inverted-connections configuration arises. In such a case, a secondary problem can be diagnosed.

Thus the invention, advantageously, allows other faults to be detected at the same time as detecting inverted connections. This advantageously allows the diagnosis of the secondary problem to be made more robust while at the same time creating a way, which previously did not exist, of diagnosing the primary problem (inverted connections).

After a first test, performed using a first timing actuator, in this instance AA, as illustrated in FIG. 1, the detection can be cross-referenced, by performing substantially the same test but using the other timing actuator, namely AE, as illustrated in FIG. 2.

The first step of the previous test, that of measuring the angular position, is of no utility here because the measurements PA2, PE2 previously taken are available and can serve as reference.

Hence, during a first step of this second test, the other of the two timing actuators AA, AE is commanded. Since previously the test was performed with AA commanded and AE immobile, in this second test, AE is commanded and AA is kept immobile.

During the course of a second step, a new (third) measurement of the angular position PA3 of the intake camshaft and of the angular position PE3 of the exhaust camshaft is performed.

Thus, by analyzing the new angular positions PA3, PE3, the influence of the command(s) previously applied to the timing actuators AA, AE can be observed.

Normally, if the two actuators AA, AE are correctly connected and operational, the angular position, in this instance PE3, of the camshaft corresponding to the timing actuator commanded, in this instance AE, should have been modified, and advantageously be compatible with the commanded angular position setpoint, in this instance SPE. Likewise, the angular position, in this instance PA3, of the camshaft corresponding to the immobile timing actuator, in this instance AA, should not have been modified.

The true situation may thus be compared against the normal situation and/or against an inverted-connections configuration.

In an inverted-connections configuration, if the two actuators AA, AE are functional but have had their connections inverted, the angular position, in this instance PE2, of the camshaft corresponding to the timing actuator that was commanded, in this instance AE, is not modified. By contrast, the angular position, in this instance PA2, of the camshaft corresponding to the immobile timing actuator, in this instance AA, is modified, and advantageously is compatible with the commanded angular position setpoint, in this instance SPE.

If a normal configuration is observed, the absence of a fault may be concluded. The detection method may be terminated.

Any situation that constitutes a departure from the normal situation may be indicative of a fault and possibly of inverted connection of the two timing actuators, namely of the intake actuator AA with the exhaust actuator AE, especially if the inverted-connections configuration is observed.

Thus, if the angular position, in this instance PE2, of the camshaft corresponding to the timing actuator commanded, in this instance AE, is not compatible with the setpoint SPE, inverted connections may be assumed.

If the diagnosis is to be made more robust, the above condition may be replaced by the following condition. It may be checked that the angular position, in this instance PE2, of the camshaft corresponding to the timing actuator commanded, in this instance AE, has not been modified and that PE2 has remained identical to PE1.

Likewise, if the angular position, in this instance PA2, of the camshaft corresponding to the immobile timing actuator, in this instance AA, has been modified, and also PA2 differs from PA1, inverted connections may be assumed.

If the diagnosis is to be made more robust, the above condition may be replaced by the following condition. It may be checked that the angular position, in this instance PA2, of the camshaft corresponding to the immobile timing actuator, in this instance AA, is compatible with the setpoint SPE.

A combination of the above two conditions, in whichever of their forms, constitutes a strong presumption and inverted connections may be reasonably diagnosed.

Other problems and/or faults may also be detected according to the results of the various comparison tests. Thus, if the angular position, in this instance PE2, of the camshaft corresponding to the timing actuator commanded, in this instance AE, has been modified but not in a way compatible with the setpoint SPE, a configuration different than the normal configuration but also different than the inverted-connections configuration arises. In such a case, a secondary problem can be diagnosed.

Likewise, if the angular position, in this instance PA2, of the camshaft corresponding to the timing actuator, in this instance AA, that is immobile, has been modified but is not compatible with the setpoint SPA, a configuration different than the normal configuration but also different than the inverted-connections configuration arises. In such a case, a secondary problem can be diagnosed.

Thus the invention, advantageously, allows other faults to be detected at the same time as detecting inverted connections.

Just one of the tests, FIG. 1 or FIG. 2, is enough to detect inverted connections. The cross-referenced duplication of the tests can be done in either order: AA then AE or, with equal preference, AE then AA.

It has been seen that the angular position measurements PA1, PA2, PA3, PE1, PE2, PE3 are made with reference to a crankshaft angular position measurement sensor. It is apparent that, because of the buildup of the various tolerances, the variability on the angular positioning of a camshaft relative to the crankshaft can be as much as +/−18° Crk. Even though this discrepancy is generally identified in order to increase the precision of the measurements, this identification may not have been performed during the execution of the method for detecting inverted connections. Hence, during the execution of the method for detecting inverted connections according to the invention, all the comparisons take account of this possible discrepancy of +/−18° Crk. Thus, an equality test X=Y becomes rather Y−18° Crk<=X<=Y+18° Crk. This advantageously allows a method for detecting inverted connections to be carried out very soon after starting, and even before the identification has been performed.

The secondary problem, previously identified according to two methodologies, is dependent on the camshaft sensors having been identified beforehand. Said identification consists in determining the absolute position of a camshaft relative to the crankshaft. This identification is typically performed by recognizing a pattern which, by using the irregularity of the teeth, allows them to be recognized and angularly positioned. If such an identification has been performed, the secondary problem is a fault with the timing actuator AA, AE commanded. If, on the other hand, such an identification has not yet been performed, the secondary problem is a fault whereby the camshaft sensor is out of tolerance.

The angular position setpoint SPA, SPE used in the preceding steps can be any. Advantageously, it is significant in that it gives rise to an angular movement of at least 5° Crk. However, it preferably remains within a limit that does not influence engine operation. It may even be different for the first test performed with a first actuator and for the second cross-test performed with the other actuator.

According to one preferred embodiment, which is advantageous in so far as it is more discriminating, a large angular amplitude of movement of the commanded camshaft is sought. Also, according to another feature, the angular position setpoint SPA, SPE is an extreme (end-of-travel) position for the possible range of travel of the timing actuator AA, AE. This may be the minimum position or else preferably the maximum position of the timing actuator AA, AE.

The invention also relates to a device implementing such a method.

The invention also relates to a vehicle comprising such a device.

The invention has been illustrated and described in detail in the drawings and the foregoing description. This should be considered as illustrative and given by way of example and not as limiting the invention to this description only. Many variant embodiments are possible.

LIST OF REFERENCE SIGNS

AA: intake timing actuator,
AE: exhaust timing actuator,
PA1, PA2, PA3: intake camshaft angular position as read by the intake camshaft sensor,
PE1, PE2, PE3: exhaust camshaft angular position as read by the exhaust camshaft sensor,
SPA: intake angular position setpoint,
SPE: exhaust angular position setpoint

The invention claimed is:

1. A method, for an internal combustion engine including an intake camshaft equipped with a variable intake valve timing device including an intake timing actuator and an exhaust camshaft equipped with a variable exhaust valve timing device including an exhaust timing actuator, of detecting inverted connection of the intake timing actuator with the exhaust timing actuator, the method comprising:
    measuring the angular position of the intake camshaft and the angular position of the exhaust camshaft;
    commanding one of the two timing actuators that are the intake timing actuator and the exhaust timing actuator according to a respective setpoint and keeping the other of the two timing actuators immobile;
    measuring the angular position of the intake camshaft and the angular position of the exhaust camshaft;
    determining when the angular position of the camshaft corresponding to the commanded timing actuator is not compatible with the setpoint;
    determining when the angular position of the camshaft corresponding to the immobile timing actuator has been modified; and
    diagnosing the inverted connection and providing a diagnostic indicator when the angular position of the camshaft corresponding to the commanded timing actuator is determined to not be compatible with the setpoint, and when the angular position of the camshaft corresponding to the immobile timing actuator is determined to have been modified.

2. The method as claimed in claim 1, wherein the diagnosing the inverted connection further comprises: diagnosing a secondary problem when one of:
    (i) the angular position of the camshaft corresponding to the commanded timing actuator is determined to have been modified but is determined to not be compatible with the setpoint, and
    (ii) the angular position of the camshaft corresponding to the immobile timing actuator is determined to have been modified but is determined to not be compatible with the setpoint.

3. The method as claimed in claim 2, wherein the secondary problem is:
    (i) a fault with the commanded timing actuator when an identification of the camshaft sensors has been performed, and
    (ii) a fault in which the camshaft sensor is out of tolerance, when the identification of the camshaft sensors has not been performed.

4. The method of claim 3, wherein the respective setpoint is a minimum position or maximum position of the respective timing actuator.

5. The method of claim 2, wherein the respective setpoint is a minimum position or maximum position of the respective timing actuator.

6. The method as claimed in claim 1, further comprising:
    commanding the other of the two timing actuators according to a respective other setpoint and keeping the first of the two timing actuators immobile;
    subsequently measuring the angular position of the intake camshaft and the angular position of the exhaust camshaft after the commanding the other of the two timing actuators according to the respective other setpoint and keeping the first of the two timing actuators immobile; and
    subsequently diagnosing the inverted connection when the subsequently measured angular position of the camshaft corresponding to the timing actuator that has been commanded is determined to not be compatible with the respective other setpoint, and when the subsequently measured angular position of the camshaft corresponding to the immobile timing actuator is determined to have been modified.

7. The method as claimed in claim 6, wherein the subsequent diagnosing comprises diagnosing a secondary problem when one of:
    (i) the angular position of the camshaft corresponding to the subsequently commanded timing actuator is determined to have been modified but is determined to not be compatible with the other setpoint, and (ii) the angular position of the camshaft corresponding to the immobile timing actuator has been modified but is not compatible with the other setpoint.

8. The method as claimed in claim 7, wherein the secondary problem is:
   (i) a fault with the commanded timing actuator when an identification of the camshaft sensors has been performed, and
   (ii) a fault in which the camshaft sensor is out of tolerance, when the identification of the camshaft sensors has not been performed.

9. The method of claim 7, wherein the respective setpoint is a minimum position or maximum position of the respective timing actuator.

10. The method of claim 6, wherein, prior to performing the commanding the other of the two timing actuators, no connection inversion has been diagnosed.

11. The method as claimed in claim 6, wherein the secondary problem is:
   (i) a fault with the commanded timing actuator when an identification of the camshaft sensors has been performed, and
   (ii) a fault in which the camshaft sensor is out of tolerance, when the identification of the camshaft sensors has not been performed.

12. The method of claim 6, wherein the respective setpoint is a minimum position or maximum position of the respective timing actuator.

13. The method as claimed in claim 1, wherein the diagnosing incorporates a tolerance on the mounting of the camshaft relative to the crankshaft.

14. The method of claim 13, wherein the tolerance on the mounting of the camshaft relative to the crankshaft is +/−18° Crk.

15. The method of claim 13, wherein the respective setpoint is a minimum position or maximum position of the respective timing actuator.

16. The method as claimed in claim 1, wherein the respective setpoint is a minimum position or maximum position of the respective timing actuator.

17. A device comprising a computer implementing the method as claimed in claim 1.

18. A vehicle comprising the device as claimed in claim 17.

19. The method as claimed in claim 1, further comprising:
commanding the other of the two timing actuators according to a respective other setpoint and keeping the first of the two timing actuators immobile;
subsequently measuring the angular position of the intake camshaft and the angular position of the exhaust camshaft after the commanding the other of the two timing actuators according to the respective other setpoint and keeping the first of the two timing actuators immobile; and
subsequently diagnosing the inverted connection when the subsequently measured angular position of the camshaft corresponding to the timing actuator that has been commanded is not determined to have been modified, and when the subsequently measured angular position of the camshaft corresponding to the immobile timing actuator is determined to be compatible with the respective other setpoint.

20. A method, for an internal combustion engine including an intake camshaft equipped with a variable intake valve timing device including an intake timing actuator and an exhaust camshaft equipped with a variable exhaust valve timing device including an exhaust timing actuator, of detecting inverted connection of the intake timing actuator with the exhaust timing actuator, the method comprising:
measuring the angular position of the intake camshaft and the angular position of the exhaust camshaft;
commanding one of the two timing actuators that are the intake timing actuator and the exhaust timing actuator according to a respective setpoint and keeping the other of the two timing actuators immobile;
measuring the angular position of the intake camshaft and the angular position of the exhaust camshaft;
determining when the angular position of the camshaft corresponding to the commanded timing actuator has not been modified;
determining when the angular position of the camshaft corresponding to the immobile timing actuator is compatible with the setpoint; and
diagnosing the inverted connection and providing a diagnostic indicator when the angular position of the camshaft corresponding to the commanded timing actuator is determined to not have been modified, and when the angular position of the camshaft corresponding to the immobile timing actuator is determined to be compatible with the setpoint.

* * * * *